United States Patent [19]
Caero

[11] 3,724,610
[45] Apr. 3, 1973

[54] BRAKE LOAD SENSING AND CONTROL DEVICE

[76] Inventor: Jose G. Caero, 4205 Clayton Road West, Ft. Worth, Tex. 76116

[22] Filed: Jan. 29, 1971

[21] Appl. No.: 111,044

[52] U.S. Cl. ............................. 188/181 T, 303/21 CH
[51] Int. Cl. ............................................... B60t 8/06
[58] Field of Search ........ 188/180, 181 T; 303/21 CH

[56] References Cited

UNITED STATES PATENTS

| | | | |
|---|---|---|---|
| 2,185,003 | 12/1939 | Stoddard | 188/181 T |
| 3,369,635 | 2/1968 | Davis | 188/181 T |
| 3,404,758 | 10/1968 | Mortimer | 188/181 T |
| 3,490,566 | 1/1970 | Von Keszycki | 188/181 T |

Primary Examiner—Duane A. Reger
Attorney—Oltsch & Knoblock

[57] ABSTRACT

A brake device responsive to changes in the coefficient of friction between a wheel of a moving vehicle and the road over which the vehicle is passing. The brake device includes a shiftable friction member engageable with part of the rotating wheel. The friction member is operatively connected into the brake actuating system for the vehicle and is constructed so as to experience a movement while the coefficient of friction between the wheel and the road is experiencing a change from the dynamic to static, such as when the wheel becomes locked and the vehicle goes into a skid. This movement of the friction member causes a reaction in the brake actuating system permitting the wheel to road coefficient of friction to return to its dynamic status.

9 Claims, 9 Drawing Figures

BRAKE LOAD SENSING AND CONTROL DEVICE

SUMMARY OF THE INVENTION

This invention relates to a brake control device for a vehicle and has application to a sensing mechanism which is responsive to the changes in the cofficient of friction between the wheel of the vehicle and the road over which the vehicle is passing.

In this invention the wheel of the vehicle includes a component which is rotatable with the wheel and which may constitute a part of the braking system for the vehicle, such as the drum of a shoe brake or the disk of a disk brake. A friction member engageable with the wheel component is carried by the vehicle and is shiftable with the vehicle wheel. The friction member may constitute a part of the braking system for the vehicle, such as a shoe of a shoe brake or a pad of a disk brake. Yieldable biasing means engaging the friction member is provided for resisting movement of the friction member with the wheel upon friction member-wheel component contact. Just before or as the vehicle begins to go into a skid with the wheel approaching or becoming non-rotatably held by the brake and as the cofficient of friction between the wheel and the road is changing from that of dynamic to a static status, the friction member overcomes the resistive force of the biasing means retarding its movement and shifts into an operative position which reduces the brake pressure and causes a release of the wheel by the brake.

The optimum braking force which can be applied to obtain maximum vehicle deceleration is largely a function of tire-to-road adhesion at the time of applying the brake. This tire-to-road adhesion is related to the braking force and wheel rotation. Through the device of this invention the amount of applied braking load is monitored as a function of the changes in the coefficient of friction between a material and a rotating or sliding surface. Thus the braking system of the vehicle is subjected to a control which substantially minimizes vehicle wheel lock during braking of the vehicle. Additionally, the device of this invention provides a means of recording changes in the cofficient of friction between vehicle tire and road surface during the application of a braking force and to monitor the brake pressure being applied to a vehicle brake.

Accordingly, it is an object of this invention to provide a device sensitive to the changes in the coefficient of friction between two engaged surfaces.

It is also an object of this invention to provide a device for sensing a change in the coefficient of friction between a brake shoe and the corresponding brake drum or disk of a vehicle.

Another object of this invention is to provide a sensing device for monitoring the braking force applied to a brake.

Another object of this invention is to provide a vehicle brake control device which is of economic construction.

Still another object of this invention is to provide a brake load sensing device for a vehicle which can be used to effectively vary the brake pressure applied to the brake so as to obtain a specifically desired braking characteristic.

Other objects of this invention will become apparent upon a reading of the invention's description.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Figure 1:
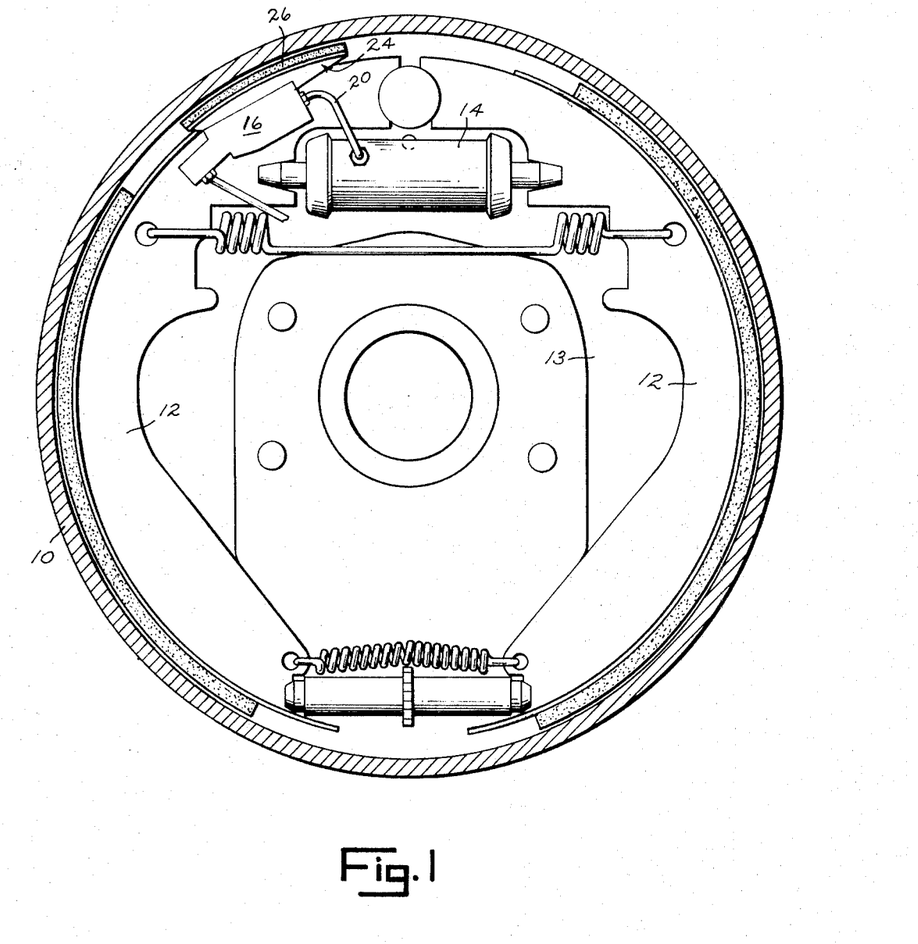
FIG. 1 is a sectional view of a shoe brake having the brake load sensing and control device of this invention secured thereto.
Figure 2:
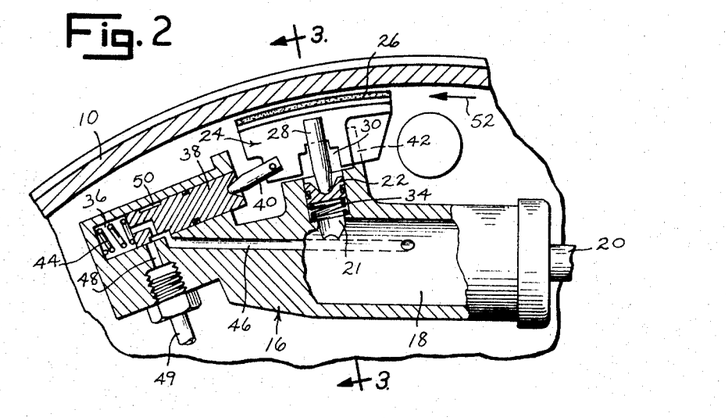
FIG. 2 is an enlarged fragmentary sectional view in detail of the brake device shown in FIG. 1.
Figures 3, 4:
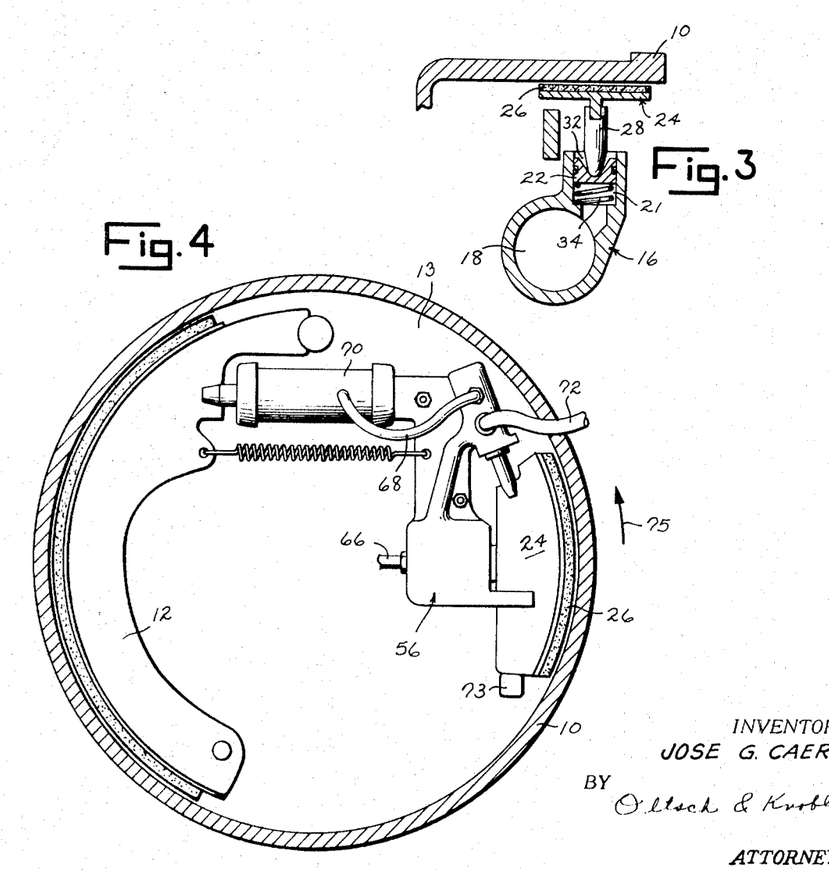
FIG. 3 is a sectional view taken along line 3—3 of FIG. 2.
FIG. 4 is a sectional view of a shoe brake shown in modified form and utilizing the brake load sensing and control device of this invention as one of the effective braking elements.

Referring to FIGS. 1-3, which illustrate the brake load sensing and control device of this invention as applied to a shoe brake, the brake drum is designated by the numeral 10. Brake drum 10 is connected to a vehicle wheel and rotates with the wheel. Brake shoes 12 are pivotally connected to a backing plate 13 of the brake assembly and are caused to frictionally engage brake drum 10 upon an increase in fluid pressure within the shoe-connected wheel cylinder 14 whose construction and operation are well known in the art. The actuating fluid for wheel cylinder 14 may be of the hydraulic type which may be pressurized by means of a foot pedal connected to a brake master cylinder and actuated by the user of the vehicle. The shoe brake thus far described is of a standard construction whose method of operation is well known in the art.

The brake load sensing and control device shown in FIGS. 1-3 includes housing member 16 which is fixedly mounted by suitable securement means to a non-rotative brake part, such as backing plate 13. Housing member 16 includes a chamber 18 which is connected by suitable conduit 20 to wheel cylinder 14. Chamber 18 of the housing member includes a cylinder part 21 in which a piston 22 is slidably disposed. A frictional member 24 is carried by piston 22. Frictional member 24 includes a friction pad 26 and is interconnected to piston 22 by means of a pin 28. The upper end of pin 28 is preferably slotted and fitted with slight clearance within cut-out 30 in friction member 24. The lower end of pin 28 is preferably tapered and fits within a conical indentation 32 in the head of piston 22. Friction member 24 is shiftable relative to housing member 16 and has its friction pad 26 normally positioned slightly spaced from brake drum 10 by means of an adjustment spring 34 positioned within cylinder part 20 and under piston 22 therein.

Housing 16 includes a second chamber 36. A spool valve member 38 is slidably positioned within chamber 36 and is interconnected to friction member 24 by a pin 40 so that lateral movement of friction member 24 in the direction of valve member 38 will cause the longitudinal movement of the valve member within chamber 36. Housing member 16 includes an abutment 42 against which friction member 24 normally rests. A spring 44 is located in the base of chamber 36 and abuts the base of valve member 38 so as to urge the valve member forwardly within its chamber and cause friction member 24 to engage abutment part 42 of the housing member. A passage 46 extends from chamber 18 to chamber 36 of the housing member. A passage 48 extends through housing member 16 and opens into chamber 36 adjacent the opening of passage 46 within the chamber. Passage 48 is connected to a conduit 49 which connects with the master cylinder of the brake system. Valve member 38 has an annular groove 50 which is positioned across the openings of passages 46 and 48, as illustrated in FIG. 2 of the drawings, when the brake system is inactivated with friction member 24 spaced from drum 10 and being urged by spring 44 against housing abutment part 42.

To operate the brake load sensing and control device heretofore described, the user of the vehicle in depressing the brake pedal will cause hydraulic fluid to flow into passage 48, groove 50, and thereafter through passage 46 into chamber 18 and cylinder part 21. From chamber 18 the fluid flows through conduit 20 into wheel cylinder 14 which causes the expansion of brake shoes 12 and the engagement of the shoes with brake drum 10. As the fluid enters cylinder part 21, piston 22 therein is urged outwardly causing friction member 24 to engage brake drum 10 nearly simultaneously with the engagement of the brake drum by shoes 12. It will be assumed that brake drum 10 rotates in the direction of arrow 52 shown in FIG. 2 so that as friction member 24 engages the brake drum it will be urged laterally to the left in FIG. 2 as a result of the movement of the drum. Continued forceful depression of the brake pedal causes an increase of hydraulic fluid pressure within chamber 18 which in turn causes shoes 12 and friction member 24 to be urged against the brake drum with greater force. Once a sufficient braking force is applied to momentarily cause brake drum 10 to become stationary or nearly stationary relative to friction member 24, an abrupt increase in the force which is exerted by the friction member against spring 44 takes place due to the change from a dynamic to a static coefficient of friction between the drum and the friction member. It has been found that in passenger cars using ordinary friction pad material the dynamic coefficient of friction between the brake drum and pad varies from 0.32 to 0.35 and the static coefficient of friction for the same components varies from 0.45 to 0.70. Thus the abrupt change in the friction member-applied force overcomes the force exerted by spring 44 and the hydraulic pressure exerted against the area of valve member 38, permitting lateral movement of the friction member and a corresponding inward movement of valve member 38 within chamber 36. This movement of valve member 38 causes groove 50 therein to be positioned out of registry with passage 46, thus cutting off the flow of hydraulic fluid into chamber 18 and brake cylinder 14.

Once the flow of hydraulic fluid into brake cylinder 14 is terminated by the blocking of passage 46, the pressure within chamber 18 and cylinder 14 decreases or decays to allow a reduction in friction pad pressure against drum 10 and to permit rotation of the drum. As drum 10 begins to rotate, the coefficient of friction between the drum and friction member 24 changes from the static to the dynamic with spring 44 and hydraulic pressure serving to urge valve member 38 forwardly within chamber 36 and causing passage 46 to be reopened. The reopening of passage 46 causes, due to the nearly constant driver-applied brake pedal force, a resurging of hydraulic pressure within chamber 18 and the brake cylinder 14 for the wheel. This resurgence of hydraulic pressure causes shoes 12 and friction pad 26 to be forced against brake drum 10. At the moment the brake drum rotation becomes stationary or nearly stationary valve member 38 shifts rearwardly in chamber 36 and again blocks passage 46, thus recycling the operation of the braking device. This cyclic operation of opening and closing passage 46 can continue until the vehicle is brought to a controlled stop.

Figure 5:
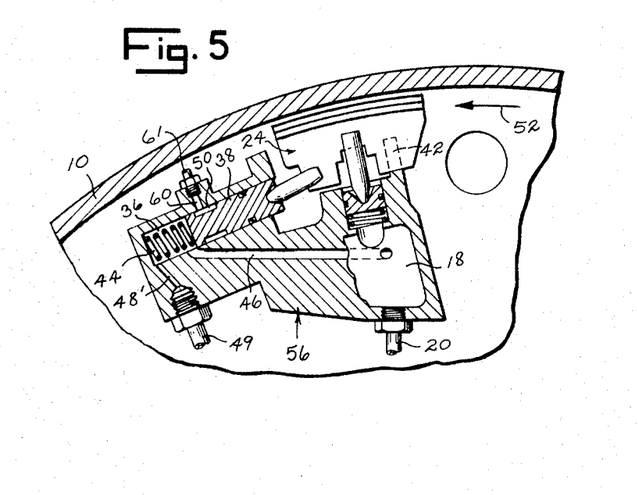
FIG. 5 is an enlarged fragmentary sectional view in detail of the brake load sensing and control device of this invention shown in modified form and applied to a shoe brake.

The embodiment of the brake control device illustrated in FIG. 5 is a modification of the device shown in FIGS. 1–3. Housing member 56 of this brake device is similar to previously described housing 16 in construction in that it contains a chamber 18 and a chamber 36 which are interconnected by a passage 46. Valve member 38 is slidably disposed within chamber 36 and is interconnected to friction member 24. A spring 44 is positioned to the rear of valve member 38 within chamber 36 and serves to normally urge friction member 24 against its stop 42 with groove 50 of the valve member being positioned forwardly of passage 46. Housing member 56 has a passage 48' therein which opens into chamber 36 behind valve member 38 and rearwardly of passage 46. Passage 48' is connected to conduit 49 extending from the master cylinder. In this embodiment, housing member 56 has a passage 60 which opens into chamber 36 just forwardly of passage 46. Passage 60 is connected to a conduit 61 which leads to the master cylinder and serves as a return for the hydraulic fluid. During a non-braking, normal travel situation, valve member 38 and friction member 24 are positioned as illustrated in FIG. 5 with passage 46 and 48' placed in communication. Passage 60 is isolated by the valve member from passages 46 and 48'. As the user of the vehicle applies pressure to the brake pedal, hydraulic fluid is forced from the master cylinder, into passage 48' and chamber 36 to the rear of the valve member 38 and into passage 46 so as to cause an increase in fluid pressure within chamber 18 and the connected wheel cylinder. This increase in pressure within chamber 18 and the wheel cylinder causes the brake shoes and friction member 24 to engage the brake drum 10. Spring 44 and hydraulic pressure against member 38 resists lateral movement of the friction member until a sufficient braking force is applied to the drum to cause a momentary wheel lock or a rapid decrease in wheel rotation or until the force of the friction member 24 overcomes the resistive force of spring 44 and hydraulic pressure against member 38, at which time the friction member moves laterally in the direction of drum rotation as designated by arrow 52. This movement of friction member 24 causes valve member 38 to shift rearwardly into chamber 36, thereby isolating passage 46 from passage 48' and placing groove 50 in communication with passage 46 and passage 60. This action relieves the hydraulic fluid pressure within chamber 18 and the connected wheel cylinder and permits the resumption of rotation of the brake drum 10. Once rotation of drum 10 resumes, spring 44 and hydraulic pressure against member 38, due to the change in the coefficient of friction between the friction member and drum, will urge valve member 38 forwardly within chamber 36 past passage 46 so as to place passages 46 and 48' again in communication and to isolate passage 60. Again the brake shoes and friction members are forced against the brake drum to cause braking action between the drum and shoes until another wheel lock occurs or until the vehicle is brought to a controlled stop.

In the modified shoe brake illustrated in FIG. 4 the brake device as shown and described in FIG. 5 is substituted for a brake shoe 12. Housing member 56 is secured to backing plate 13. A conduit 66 is connected to passage 48' in housing member 56 and serves to connect the housing member to the master cylinder of the braking system. A conduit 68 is connected to chamber 18 and serves to interconnect housing member 56 with wheel cylinder 70 which activates the only full brake shoe 12. A conduit 72 is connected to fluid-relief passage 60 and serves to interconnect housing member 56 with the return port in the master cylinder of the braking system. Backing plate 13 carries a rest 73 which supports friction member 24 during the periods of time the brake system is not used, or when brake application occurs as the wheel is rotating opposite to arrow 75. During application of a braking force, both brake shoe 12 and friction member 24 which carries an enlarged friction pad 26 will be forced against drum 10 which rotates in the direction of arrow 75 when the vehicle is moving forwardly. The operation of friction member 24 in cutting off the hydraulic fluid into wheel cylinder 70 is the same as that described for the embodiment of FIG. 5.

Figure 6:
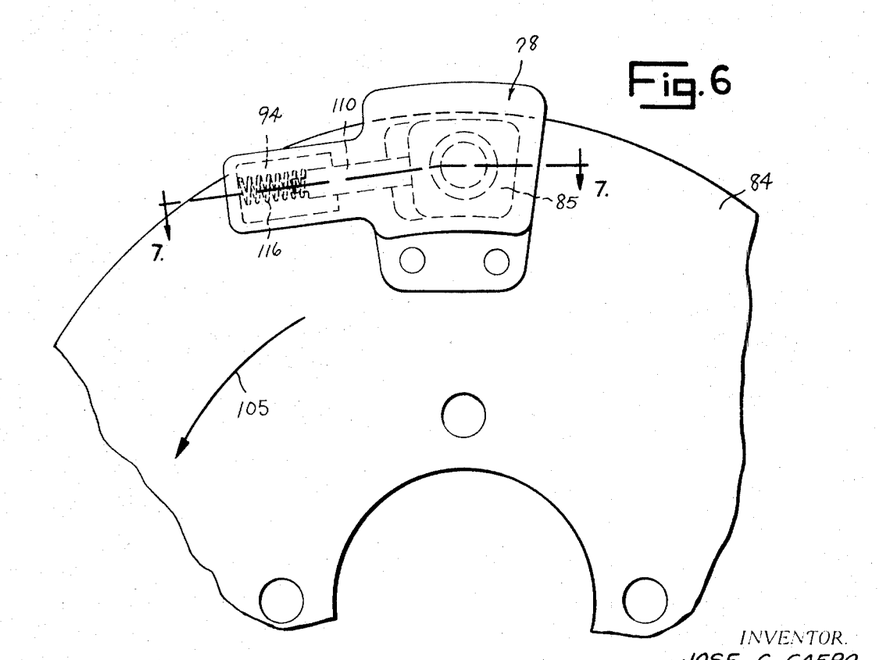
FIG. 6 is a fragmentary view of the brake load sensing and control device of this invention as applied to a disk brake.
Figure 7:
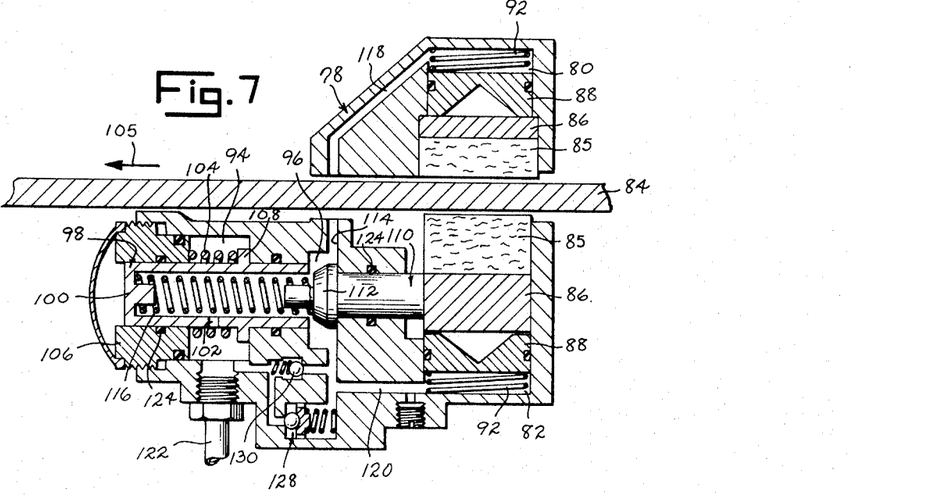
FIG. 7 is an enlarged detail sectional view of the brake device taken along line 7—7 of FIG. 6.

In FIGS. 6 and 7, the brake device of this invention is applied to a disk brake. Housing member 78 includes two friction pad chambers 80 and 82. Pad chambers 80 and 82 are positioned on opposite sides of brake disk 84 at the outer circumferential margin of the disk and each house a friction pad comprising friction material 85 mounted to a backing material 86. Each friction pad is shiftably carried within its respective pad chamber with its frictional material 85 being positioned adjacent disk 84. A piston 88 is positioned within each chamber 80 and 82 just behind backing material 86 of the friction pad therein. Spring 92 is positioned within each chamber 80 and 82 behind the piston 88 therein.

Housing member 78 includes a hydraulic fluid inlet chamber 94 and a valve-receiving chamber 96. A sleeve member 98 having one end closed by wall 100 is shiftably carried within housing member 78 and is positioned with its open end located adjacent valve-receiving chamber 96. Sleeve member 98 extends through fluid inlet chamber 94 and has an opening 102 formed in its side wall which communicates with chamber 94. Sleeve member 98 is biased into a selected position within housing member 78 by means of a spring 104 which is positioned between adjustable part 106 of housing member 78 and a flanged shoulder 108 of the sleeve member.

A valve stem 110 is shiftably carried within housing member 78 and has one end abutting one of the brake friction pads at preferably the backing material 86 of the pad. The friction pad which valve stem 110 engages is not restrained from lateral movement like the other friction pad, but instead is free to experience limited lateral movement in the direction of rotation (see arrow 105) of disk 84. The opposite end of valve stem 110 carries a conically shaped valve part 112 which is located within valve-receiving chamber 96. Valve part 112 is positioned adjacent the open end of the sleeve member 98 and is normally held against wall 114 of chamber 96 and spaced from member 98 by means of a yieldable spring 116 which is located within sleeve member 98 with one end abutting end wall 100 of the sleeve and its opposite end abutting the forward end face of valve part 112. A passage 118 interconnects valve receiving chamber 96 with pad chamber 80 and a passage 120 interconnects chamber 96 with pad chamber 82. It is to be understood that passage 118 is continuous and extends round the outer margin of disk 84. A conduit 122 interconnects fluid inlet chamber 94 with the master cylinder of the vehicle braking system. O-rings 124 or similar suitable seal means serve to prevent fluid leakage between housing member 78 and shiftable sleeve member 98 and valve stem 110.

During non-use of the vehicle braking system, the control device is in the inactivated status illustrated in FIG. 7. As the user of the vehicle applies pressure to the brake pedal, hydraulic fluid from the master cylinder enters chamber 94, passes through opening 102 into sleeve member 98, out the open end of sleeve member and into chamber 96. From chamber 96 the fluid passes into passage 118 and 120 and pad chambers 80 and 82 causing the friction pads therein to be pressed against friction disk 84. As the friction pad against which valve stem 110 is urged is forced into frictional engagement with disk 84, friction material 85 and backing material 86 including valve stem 110 are urged laterally in the direction of rotation of the disk. This lateral movement of the pad and valve stem is resisted by springs 104 and 116 and the hydraulic pressure against valve part 112. Continued application of the brake pedal force causes an increase in pressure between the friction pads and friction disk 84 until the pads and disk momentarily lock with the coefficient of friction between friction material 85 and disk 84 changing from the dynamic to the static and thereby causing an abrupt increase in force against valve stem 110. This increase in force causes the valve part 112 to come into sealing contact with the open end of the sleeve member 98 and to isolate passages 118 and 120 from brake fluid inlet chamber 94. As valve part 112 abuts the open end of sleeve member 98, spring 104 is designed to yield so as to permit the sleeve member to shift to the left as viewed in FIG. 7 with valve part 112. This movement of sleeve member 98 increases the volume of chamber 96 to permit a reduction in fluid pressure within pad chambers 80 and 82 and a resulting resumption of relative movement between the pads and friction disk 84. Once relative movement is resumed between friction materials 85 and disk 84, spring 104, spring 116 and hydraulic pressure against valve stem 110 urge sleeve member 98 and valve part 112 into their positions as shown in FIG. 7, with the valve part being spaced from the open end of the sleeve member so as to permit the resumption of communication between brake fluid inlet chamber 94 and passages 118 and 120. Once communication between chamber 94 and passages 118 and 120 is resumed, fluid pressure within pad chambers 80 and 82 is increased to increase the frictional engagement force between friction materials 85 and disk 84 and continue with the braking action or until momentary locking of the friction pads with the disk again occurs which again forces the valve part 112 against the open end of the sleeve member to cause isolation of passages 118 and 120 from the master cylinder.

Valve 128 in housing 78 of the braking device illustrated in FIG. 7 serves as a pressure relief means which allows a hydraulic fluid bypass of the control device in a panic stop. To ensure a rapid return of hydraulic fluid to the master cylinder upon release of the brake pedal, a ball valve 130 is included in the system.

Figure 8:
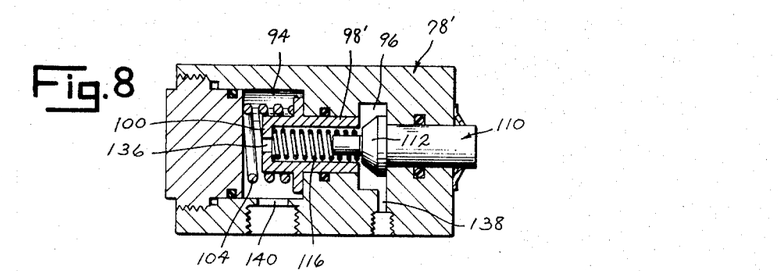
FIG. 8 is a modified construction of the actuating means for the brake device shown in FIG. 7.

FIG. 8 illustrates a modified embodiment of the brake control device shown and described in FIG. 7. In FIG. 8, sleeve member 98' projects into brake fluid chamber 94 and has an opening 136 formed in its end wall 100. A passage 138 formed in housing member 78' communicates with valve-receiving chamber 96 and may be connected by suitable conduit means (not shown) to chambers 80 and 82 of the friction pads in FIG. 7. Thus, hydraulic fluid from the master cylinder is urged through passage 140 into fluid inlet chamber 94 where is passes through opening 136 into the interior of sleeve member 98'. The fluid then passes between the open end of the sleeve member and valve part 112 and out passage 138 into the chambers housing the friction pads. The remainder of the operation of the control device shown in FIG. 8 is similar to the operation of the control device of FIG. 7.

Figure 9:
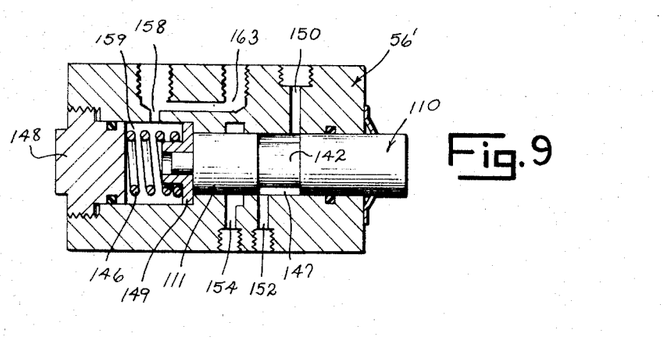
FIG. 9 is another modified construction of the actuating means for the load sensing and control device shown in FIG. 5.

FIG. 9 illustrates a modified embodiment of the brake control device shown and described in FIG. 5. In FIG. 9 valve stem 110 carries a spool valve part 111 which has a groove 142 formed therein. The spool valve part is shiftably carried within a chamber 147 in housing member 56' which is only partially shown in FIG. 9. A spring 146 is carried in chamber 147 between housing part 148 and valve part 111 and has its one end abutting a cover disk 149 which is carried at the inner end of the valve part and its other end abutting housing part 148. Housing member 56' includes a hydraulic fluid inlet port 150 which is adapted to be connected by a suitable conduit to the master cylinder of the vehicle braking system and which opens into chamber 147. A fluid inlet port 158 communicates with portion 159 of chamber 147 and is also adapted for connection by a suitable conduit to the master cylinder. Part 158 denotes a source of regulated pressure. A passage 152 is also formed within housing member 56' and opens into valve chamber 147. Passage 152 may be connected by suitable means to chamber 18 which is shown in FIG. 5. Another passage 154 is also formed in housing member 56' and communicates with valve chamber 147. Passage 154 is adapted to be connected to the master cylinder of the brake assembly and serves as a fluid return whose function will be later described. A port 163 also preferably interconnects with port 158 and is adapted for connection to housing chamber 18. The connection between port 158 and the master cylinder includes a restricting valve whereby the hydraulic pressure from the master cylinder to port 158 is regulated up to a valve which corresponds to optimum tire friction sensitivity and which is unaffected by increased hydraulic pressure due to an increase in pedal pressure.

With valve part 111 positioned as shown in FIG. 9, passages 150 and 152 are placed in communication through groove 142 in the valve part with passage 154 being blocked. With valve part 111 so positioned, hydraulic fluid from the master cylinder enters port 158 and passage 150 concurrently, flows around groove 142, and then enters passage 152 where it passes into chamber 18 to cause the friction member 24 and the brake shoes to frictionally engage the rotating drum. Initial movement of the valve stem and connected valve part is resisted by spring 146 and fluid pressure in chamber portion 159. The frictional force between the brake shoes and the drum increases due to an increase in the application of brake pedal pressure, while the pressure within chamber portion 159 remains essentially constant and therefore the resistance against valve stem 110 remains essentially constant. If this pedal pressure is increased until the motion of the drum in relation to the friction member approaches zero, the coefficient of friction between the friction member and the drum will begin experiencing a change from the dynamic to the static, thus causing an increase in the force friction member 24 exerts against the valve stem 110 until this force will be sufficient to cause the valve part 111 to shift into chamber 147 or to the left as viewed in FIG. 9. As valve part 111 shifts into chamber 147, passage 150 is blocked to cut off hydraulic fluid flow from the master cylinder and passages 152 and 154 are placed in communication through groove 142 to cause an immediate decrease of pressure within the brake cylinder chambers which in turn causes a reduction of braking force to permit rotation of the drum. As rotation of the brake drum causes a return of dynamic coefficient of friction conditions between friction member 24 and the drum, the regulated pressure maintained in chamber portion 159 and spring 146 will urge valve part 111 forwardly in chamber 147 and back into its position as seen in FIG. 9 wherein passages 150 and 152 are again placed in communication. With passages 150 and 152 again placed in communication, further braking action occurs until another wheel lock situation develops, in which case valve part 111 is again shifted into chamber 147 to isolate passages 150 and 152 and thus repeat the brake control cycle which continues until the vehicle is brought to a controlled stop.

It is to be understood that pneumatic, positive or vacuum pressure can be used in lieu of hydraulic actuating pressure, or a combination of both, such as in FIG. 9 where fluid inlet port 158 can be connected to a hydraulic pressure source, passage 150 connected to a pneumatic pressure source, such as in power brakes, and passage 154 can be vented to atmosphere. It is further to be understood that while the valve-control devices of FIGS. 8 and 9 are illustrated and above described as being an improvement to the brake control devices illustrated in FIGS. 7 and 5 respectively, such devices could be incorporated into any braking system. Additionally, the valve control devices illustrated in FIGS. 8 and 9, as well as the corresponding valve control parts illustrated in the remaining figures of this invention, could be utilized as load sensing or pressure monitoring devices to which electrical, hydraulic or mechanical control means may be associated.

The term master cylinder may be broadly defined to include any pressure applying or pressure connecting device.

It is also to be understood that the invention is not to be limited to the details herein given but may be modified within the scope of the appended claims.

What I claim is:

1. A load control device for a brake having a moving member associated with a wheel for coordinated movement with said wheel comprising a housing carrying a friction member and a fluid actuated piston and cylinder means for causing said friction member to engage said moving member at varying pressure in proportion to the fluid pressure exerted upon said piston, said housing including means for guiding movement of said friction member from a first position to a second position in the general direction of movement of said moving member when said friction member is engaged with said moving member, biasing means normally locating said friction member in its first position, said biasing means being yieldable to permit said friction member to shift into its said second position as relative movement between said friction member and moving member ceases during engagement of said friction and moving members, valve means associated with said friction member and movable therewith when said friction member shifts from its first into its second position for reducing the fluid pressure exerted upon said piston to permit relative movement between said friction member and said moving member.

2. The load control device of claim 1 wherein said valve means comprises a spool valve shiftably carried within a receiving chamber in said housing, one end of said spool valve being operatively associated with said friction member so that movement of said friction member from its first into its second position causes a correlated movement of said spool valve within said receiving chamber, said housing and spool valve cooperating when said friction member is in its first position to define passage means communicating with said piston and cylinder means and receiving chamber and through which actuating fluid passes to said piston and cylinder means for increasing the fluid pressure upon said piston, said housing and spool valve cooperating when said friction member is in its second position in restricting said passage means to reduce the fluid pressure upon said piston.

3. The load control device of claim 2 and including a brake shoe engageable with said wheel, a second piston and cylinder means for causing said brake shoe to engage said moving member at varying brake loads correlated to the pressure between said friction member and moving member.

4. The load control device of claim 1 wherein said housing has a receiving chamber formed therein, a shiftable valve seat member positioned within said receiving chamber, said valve seat member and housing defining passage means in communication with said piston and cylinder means for permitting actuating fluid to enter said piston and cylinder means and increase the fluid pressure exerted upon said piston, said valve means including a valve part shiftable into contact with said valve seat member to block said passage means when said friction member shifts into its second position.

5. The load control device of claim 4 and means permitting shiftable movement of said valve seat member within said receiving chamber upon contact of said valve part, said shiftable movement of said valve seat member causing an increase in volume in said passage means between said valve seat member and said piston and cylinder means to reduce the fluid pressure upon said piston, said biasing means being carried by said valve seat member, second biasing means for resisting shiftable movement of said valve seat member upon valve part contact until said friction member and movable member engage and rotative movement between said friction and movable members ceases.

6. The load control device of claim 2 wherein said passage means communicating with said piston and cylinder means and receiving chamber serves to permit accumulation of actuating fluid in said receiving chamber behind said spool valve at its opposite end to assist said biasing means in locating said friction member in its first position.

7. A load control device for a brake having a moving member associated with a wheel for coordinated movement with said wheel comprising a housing having a shiftable friction member engageable with said moving member for the purpose of applying a braking force to said wheel, fluid actuated piston and cylinder means for causing said friction member to engage said moving member at varying pressures in proportion to the fluid pressure exerted upon said piston, said housing including means for guiding reversible movement of said friction member from a first to a second position in the general direction of movement of said moving member when said friction member is engaged with said moving member, biasing means normally locating said friction member in its first position, said biasing means being yieldable to permit said friction member to shift into its second position as relative movement between said friction member and moving member ceases during engagement of said friction member and moving members, valve means associated with said friction member and movable therewith from an open position toward a flow restricting closed position when said friction member shifts from its first into its second position for reducing the fluid pressure exerted upon said piston to permit the resumption of relative movement between said friction member and said moving member.

8. The load control device of claim 7 wherein said housing has a receiving chamber formed therein, a shiftable valve seat member positioned within said receiving chamber, said valve seat member and receiving chamber defining passage means in communication with said piston and cylinder means for permitting actuating fluid to enter said piston and cylinder means and increase the fluid pressure exerted upon said piston, said valve means including a valve part shiftable into contact with said valve seat member to block said passage means when said friction member is shifted into its second position.

9. The load control device of claim 8 and means permitting shiftable movement of said valve seat member within said receiving chamber upon contact of said valve part, said shiftable movement of said valve seat member causing an increase in volume in said passage means between said valve seat member and said piston and cylinder means to reduce the fluid pressure upon said piston, said biasing means being carried by said valve seat member, second biasing means for resisting shiftable movement of said valve seat member upon valve part contact until said friction member and movable member engage and rotative movement between said friction and movable members ceases.

* * * * *